United States Patent [19]
Wand et al.

[11] Patent Number: 4,916,379
[45] Date of Patent: Apr. 10, 1990

[54] DC-TO-DC CONVERTER USING RELAY COIL

[75] Inventors: Thomas J. Wand, Clarkston; Phillip A. Gaubis, Walled Lake, both of Mich.

[73] Assignee: TRW Inc., Lyndhurst, Ohio

[21] Appl. No.: 362,578

[22] Filed: Jun. 7, 1989

[51] Int. Cl.$^4$ .......................................... H02M 3/155
[52] U.S. Cl. .................................... 323/222; 180/79.1; 180/142; 307/39; 318/599; 323/259
[58] Field of Search ............... 180/142, 79.1; 318/599; 323/222, 259; 307/39

[56] References Cited

U.S. PATENT DOCUMENTS

| | | | |
|---|---|---|---|
| 3,571,697 | 3/1971 | Phillips | 323/222 |
| 3,869,660 | 3/1975 | Davis et al. | 331/113 R |
| 4,155,112 | 5/1979 | Miller et al. | 363/21 |
| 4,322,787 | 3/1982 | Kraus | 323/222 |
| 4,357,654 | 11/1982 | Ikenoue et al. | 363/21 |
| 4,471,280 | 9/1984 | Stack | 318/586 |
| 4,549,254 | 10/1985 | Kissel | 363/21 |
| 4,660,671 | 4/1987 | Behr et al. | 180/142 |
| 4,771,843 | 9/1988 | Shimizu | 180/79.1 |
| 4,792,887 | 12/1988 | Bernitz et al. | 323/222 |

FOREIGN PATENT DOCUMENTS

| | | |
|---|---|---|
| 45-1508170 | 5/1970 | Japan . |
| 59-47616 | 3/1984 | Japan . |
| 242982 | 9/1969 | U.S.S.R. . |

OTHER PUBLICATIONS

ISCAS Proceedings Article (pp. 936, 937), "A New DC-DC Converter with Continuous Flow of Induction Current," Kulaivic et al., Jul. 17-19, 1979.

*Primary Examiner*—William H. Beha, Jr.
*Attorney, Agent, or Firm*—Tarolli, Sundheim & Covell

[57] ABSTRACT

A DC-to-DC converter is disclosed that uses a relay coil as an inductor. A relay has a coil and an associated relay contact. When the coil is energized, the contact closes and connects a first DC voltage signal to an electrical load. The coil is periodically energized and de-energized. The duration of de-energization is less than that necessary to permit the contact to open. The periodic energization and de-energization of the coil results in voltage values being developed across the coil. A rectifying diode is used to electrically couple the coil to a storage capacitor. The voltage developed across the storage capacitor provides a second DC voltage signal having a value greater than the first DC voltage signal relative to a common reference.

9 Claims, 2 Drawing Sheets

DC-TO-DC CONVERTER USING RELAY COIL

TECHNICAL FIELD

The present invention relates to a DC-to-DC converter and is particularly directed to an apparatus for controlling a relay while simultaneously using the coil of the relay as an inductor to provide DC-to-DC voltage conversion.

BACKGROUND ART

DC-to-DC converters for stepping up a DC voltage value are well known in the art. One type of DC-to-DC converter uses an inductive "fly-back" principle to provide an increased voltage value. An inductive "fly-back" converter includes an inductor having a first terminal connected to a DC voltage source and a second terminal connected to a switching circuit. A drive circuit periodically energizes and de-energizes the switching circuit to connect and disconnect the second inductor terminal with electrical ground and thereby energize and de-energize the inductor. When the inductor is energized, a magnetic field is established by electrical current flowing through the inductor. When the electrical current through the inductor is abruptly cut off, i.e., the inductor is de-energized, the magnetic field collapses. When the magnetic field collapses, a voltage is developed across the inductor. This developed voltage is added to the value of the DC voltage source thereby resulting in voltage spikes at the second terminal of the inductor. These voltage spikes have a value greater than the value of the DC voltage source. A rectifying diode and filter capacitor is connected to the second terminal of the inductor and provides a DC voltage having a value greater than the value of the DC voltage source.

The use of DC-to-DC converters in the automotive art is also known. One particular use of DC-to-DC converters in the automotive art is in the area of electric assist steering. U.S. Pat. No. 4,660,671 to Behr et al., assigned to the assignee of the present application, discloses a power assist steering system that includes an electric assist motor, a drive circuit, a main power connection relay electrically connected between the vehicle battery and the drive circuit, and a DC-to-DC voltage-up converter connected to the drive circuit. The DC-to-DC converter provides a DC voltage having a value greater than the value of the battery voltage. The increased voltage value is necessary for proper operation of the drive circuit. The DC-to-DC converter disclosed in the '671 patent is a commercially available item. Such a converter uses an externally connected inductor coil. While commercially available DC-to-DC converters have proven to be quite satisfactory in their function, it is desirable (i) to reduce the number of electrical components in an electrical system, (ii) to reduce the physical size of the system, and (iii) to reduce the cost of manufacturing the system.

SUMMARY OF THE INVENTION

The present invention is directed to an apparatus for controlling operation of a relay while simultaneously providing DC-to-DC conversion using the coil of the relay as an inductor.

In accordance with the present invention, a DC-to-DC converter is provided comprising a relay having an inductor coil and an associated relay contact. One contact terminal of the relay is connected to a source of electrical energy and the other contact terminal of the relay is connected to an electrical load. The relay contact is movable to an open or a closed condition in response to an energization condition of the inductor coil. When the relay contact is closed, the two contact terminals are electrically connected. The relay contact does not change from a closed condition to an open condition unless the energization condition of the inductor coil necessary for an open condition has existed for a predetermined time period. The converter further includes drive circuit means connected to the inductor coil for energizing and de-energizing the inductor coil with a periodic drive signal. The duration of the portion of the periodic drive signal that would otherwise result in an open condition of the relay contact is less than the predetermined time period so as to maintain the relay contact closed. The converter further includes rectifying circuit means connected to the junction of the drive circuit means and the inductor coil for rectifying a voltage signal resulting from the periodic energization and de-energization of the inductor coil and thereby provide a converted DC voltage signal.

In accordance with a preferred embodiment of the present invention, an apparatus is provided for connecting a first DC voltage source to an electrical load and for providing a second DC voltage having a value greater than the value of the first DC voltage source. The apparatus comprises a relay having an inductor coil and an associated relay contact. One terminal of the inductor coil is connected to the first DC voltage source. One contact terminal of the relay is connected to the first DC voltage source. The other contact terminal of the relay is connected to the electrical load. The relay contact is movable from an open condition to a closed condition in respose to energization of the inductor coil. The relay contact is movable from a closed condition to an open condition in response to de-energization of the inductor coil. The relay contact does not move from the closed condition to the open condition unless the inductor coil has been de-energized for a predetermined time period. A drive circuit is connected to the second terminal of the inductor coil. The drive circuit energizes and de-energizes the inductor coil by, respectively, connecting and disconnecting the second terminal of the inductor coil to and from electrical ground. The time duration of the de-energizing portion of the periodic drive signal is less than the predetermined time period needed to open the relay contact. This maintains the relay contact closed so as to maintain the first DC voltage source connected with the electrical load. A rectifying circuit is connected to the junction of the drive circuit and the inductor coil and to the first DC voltage source for rectifying the voltage signal resulting from the periodic energization and de-energization of the inductor coil. The rectified signal provides a second DC voltage having a value greater than the value of the first DC voltage source. The rectifying circuit includes a diode having its anode connected to the junction of the inductor coil terminal and the drive circuit, and a capacitor connected to the cathode of diode and to either the first DC voltage source or the ground reference of the first DC voltage source. A Zener diode is connected in parallel with the capacitor.

BRIEF DESCRIPTION OF THE DRAWINGS

Further features and advantages of the present invention will become apparent to those skilled in the art to which the present invention relates from a reading of the following specification made with reference to the accompanying drawings, in which.

DESCRIPTION OF THE PREFERRED EMBODIMENT

Figure 1:
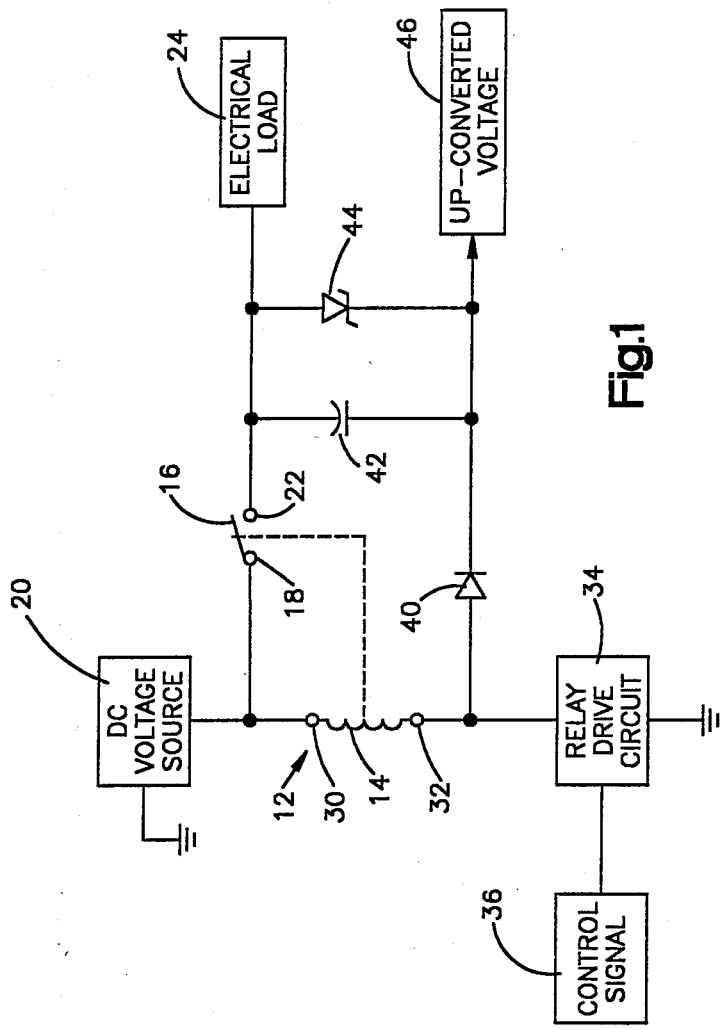
FIG. 1 is a schematic illustration of a DC-to-DC converter made in accordance with the present invention.

Referring to FIG. 1, a DC-to-DC converter 10, in accordance with the present invention, utilizes a main power connection relay 12. The relay 12 includes an inductor coil 14 and an associated, normally open relay contact 16. A first terminal 18 of the relay 12 is electrically connected to a DC voltage source 20. A second terminal 22 of the relay 12 is electrically connected to an electrical load 24. When the relay coil 14 is energized, the relay contact 16 "pulls in," i.e., closes, thereby connecting the DC voltage source 20 to the electrical load 24.

In accordance with the present invention, a first terminal 30 of the coil 14 is connected to the DC voltage source 20. A second terminal 32 of the coil 14 is connected to a relay drive circuit 34. The relay drive circuit 34, upon receiving a control signal 36, periodically connects the terminal 32 of coil 14 to electrical ground.

During that portion of the drive signal in which the terminal 32 is connected to electrical ground, the coil 14 is energized which closes the relay contact 16. When relay contact 16 is closed, terminal 18 is electrically connected to terminal 22 and, in turn, the DC voltage source 20 is electrically connected to the electrical load 24. That portion of the drive signal in which the terminal 32 is not connected to electrical ground is of a duration less than that required for the relay contact 16 to open.

When the coil 14 is energized, i.e., terminal 32 connected to electrical ground, a magnetic field is established through and around coil 14 as a result of current flowing therethrough. When the terminal 32 is disconnected from electrical ground, the magnetic field collapses. As a result of the periodic energization and deenergization of the coil 14, voltage spikes appear at the terminal 32 having a voltage value substantially in excess of the value of the DC voltage source 20 and inverted in polarity.

A rectifying diode 40 having its anode connected to the terminal 32 of coil 14 is used to rectify the electrical signal appearing at terminal 32. A charging capacitor 42 is electrically connected between the cathode of the rectifying diode 40 and terminal 22 of the relay 12. A Zener diode 44 is electrically connected in parallel with the capacitor 42. The capacitor 42 filters the output from the rectifying diode 40. The Zener diode 44 ensures that the value of the voltage charge developed across capacitor 42 does not exceed a value which is established by the characteristics of the Zener diode 44. The resultant output is an up-converted voltage 46 having a positive DC voltage value relative to the DC voltage source 20. The converted DC voltage is added to the output of the DC voltage source 20 thereby resulting in a DC voltage value greater than the value of the output of the DC voltage source 20.

Figure 2:
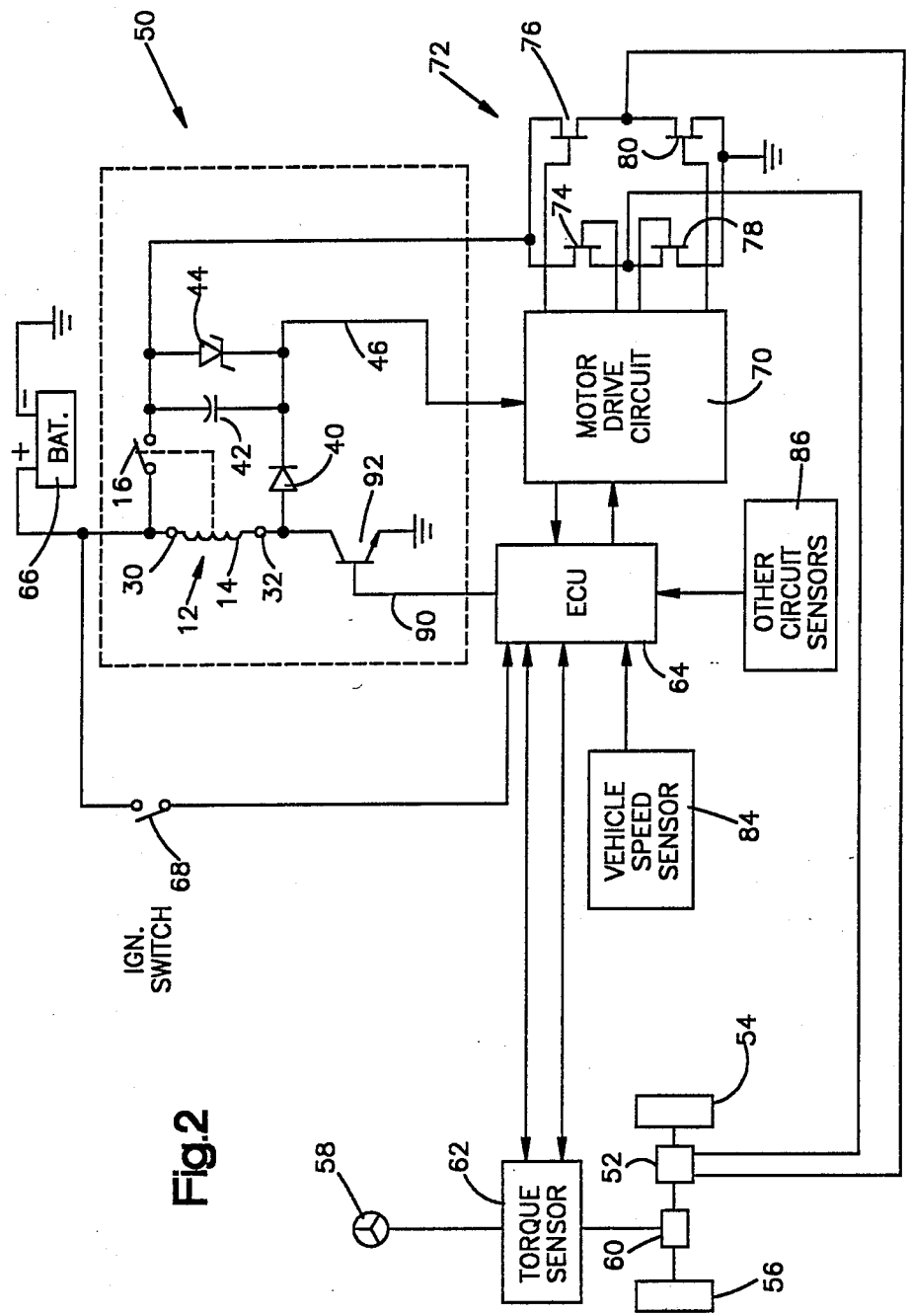
FIG. 2 is a schematic illustration of an electric assist steering system employing a DC-to-DC converter made in accordance with the present invention.

Referring to FIG. 2, a specific application of the present invention is embodied in an electric assist steering system of the type disclosed in U.S. Pat. No. 4,660,671 to Behr et al., assigned to the assignee of the present invention, the disclosure of which is hereby fully incorporated herein by reference. The electric assist steering system 50 includes an electric assist motor 52 operatively connected to the vehicle's steerable wheels 54, 56. The vehicle's steering wheel 58 is operatively coupled to a pinion gear of a rack and pinion gear set 60 through a torque sensor 62. The outputs of the torque sensor are electrically connected to an electronic control unit ("ECU") 64. The ECU 64 is connected to the vehicle battery 66 through an ignition switch 68. The ECU 64 is electrically connected to and controls a motor drive circuit 70. The motor drive circuit 70 is electrically connected to an "H" bridge 72 comprising four, power, field-effect transistors ("FETs") 74, 76, 78, and 80. The junction of FETs 74, 76 is electrically connectable to the vehicle battery 66 through the relay contact 16 of the relay 12. The junction of FETs 78, 80 is electrically connected to electrical ground. The junction of FETs 74, 78 and the junction of FETs 76, 80 are electrically connected to respective terminals of the electric assist motor 52.

The ECU 64 is electrically connected to a vehicle speed sensor 84 and to other circuit sensors 86. The other circuit sensors 86 can, for example, monitor the temperature of the power FETs 74, 76, 78, and 80 and current draw by the electric assist motor 52 and provide signals indicative thereof to the ECU 64.

When the power assist steering system is energized by closure of the ignition switch 68, the electronic control unit monitors the various circuit conditions including the outputs from sensors 86, proper operation of the torque sensor 62, and proper operation of the motor drive circuit 70 as is more fully described in the above-incorporated '671 patent. Assuming that all circuit conditions meet predetermined criteria as described in detail in the '671 patent, the ECU 64 outputs a control signal 90 to turn ON a drive transistor 92 and effectively connect terminal 32 of coil 14 to electrical ground. When the coil 14 is energized, the relay 16 closes thereby providing electrical energy to the H-bridge 72 which, in turn, permits energization of the electric assist motor 52.

In order to insure proper operation of the H-bridge network 72, the motor drive circuit 70 requires an operating voltage having a value greater than the voltage value provided by the battery 66. Accordingly, when the ECU has determined proper operation of the drive control circuit 50, the control signal 90 is provided having a duty cycle sufficient to maintain the relay contact 16 closed. The periodic energization and deenergization of the coil 14 provides a DC, up-converted voltage 46 having a voltage value substantially greater than the voltage value provided by the battery 66. This increased voltage is connected to the motor drive circuit 70.

It will be appreciated, that the present invention provides a control circuit for controlling the operation of a relay coil while simultaneously using the relay coil as an inductor to provide a DC up-converted voltage thereby eliminating the need for a separate inductor coil.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, the following is claimed:

1. A DC-to-DC converter comprising:

a relay having an inductor coil and an associated relay contact, one contact terminal connected to a source of electrical energy and another contact terminal connected to an electrical load, said contact being movable to an open or a closed condition in response to an energization condition of said inductor coil, said relay contacts not changing from a closed condition to an open condition unless the energization condition of said inductor coil necessary for an open condition has existed for a predetermined time period;

drive circuit means connected to said induction coil for energizing and de-energizing said inductor coil with a periodic drive signal, the duration of the portion of the periodic drive signal that would otherwise result in an open condition of the relay contact being less than said predetermined time period so as to maintain the relay contact closed; and rectifying circuit means connected to said inductor coil for rectifying a voltage signal resulting from the periodic energization and de-energization of said inductor coil and providing a converted DC voltage signal.

2. The DC-to-DC converter of claim 1 wherein the source of electrical energy is a DC voltage having a reference and a positive voltage value, said rectifying circuit means includes a diode having its anode connected to said inductor coil, a capacitor connected to the cathode of said diode and to the positive voltage of the source of electrical energy, a charge voltage developing at the capacitor and diode connection having a value substantially greater than the DC voltage value of the source of electrical energy relative to the reference of the source of electrical energy.

3. The DC-to-DC converter of claim 1 wherein said rectifying circuit means further includes a Zener diode connected in parallel with said capacitor to regulate the converted DC voltage signal.

4. An apparatus for connecting a first DC voltage signal, having a value relative to a reference, to an electrical load and for providing a second DC voltage signal having a value relative to the reference which is greater than the value of the first DC voltage signal, said apparatus comprising:

a relay having an inductor coil and an associated relay contact, one contact terminal of said relay connected to said first DC voltage signal and a second contact terminal of said relay contact connected to said electrical load, said relay contact being movable from an open condition to a closed condition in response to energization of said inductor coil and from a closed condition to an open condition in response to de-energization of said inductor coil, said relay contact not changing from a closed condition to an open condition unless said inductor coil has been de-energized for a predetermined time period;

drive circuit means connected to said induction coil for energizing and de-energizing said inductor coil with a periodic drive signal, the portion of the periodic drive signal that would otherwise cause said contact to open being less than said predetermined time period so as to maintain the relay contact closed; and rectifying circuit means connected to said inductor coil for rectifying a voltage signal resulting from the periodic energization and de-energization of said inductor coil and providing a second DC voltage signal having a value greater than the value of the first DC voltage signal relative to said reference of said first DC voltage signal.

5. The DC-to-DC converter of claim 4 wherein said rectifying circuit means includes a diode having its anode connected to said inductor coil, a capacitor connected to the cathode of said diode and to the first DC voltage signal, said capacitor developing said second DC voltage signal thereacross.

6. The DC-to-DC converter of claim 5 wherein said rectifying circuit means further includes a Zener diode connected in parallel with said capacitor to regulate the value of said second DC voltage signal.

7. A DC-to-DC converter for use in an electric assist steering system of the type having an electric assist motor, a switching network for selectively connecting a first DC voltage signal, having a value relative to a reference, to the electric assist motor for energization thereof, a main power connection relay, said relay having an inductor coil and an associated relay contact, one contact terminal connected to said DC voltage signal and another contact terminal connected to an electrical load, said contact being movable from an open condition to a closed condition in response to energization of said inductor coil and from a closed condition to an open condition in response to de-energization of said inductor coil, said relay contact not changing from a closed condition to an open condition unless said inductor coil has been de-energized for predetermined time period, and an electric assist drive circuit for controlling the switching network in response to applied steering torque, said converter comprising:

drive circuit means connected to said inductor coil for energizing and de-energizing said inductor coil with a periodic drive signal, the duration of the de-energization portion of the periodic drive signal being less than said predetermined time period so as to maintain the relay contact closed; and rectifying circuit means connected to said inductor coil for rectifying a voltage signal resulting from the periodic energization and de-energization of said inductor coil and providing a second DC voltage signal having a value, relative to the reference, greater than the value of the first DC voltage signal.

8. The DC-to-DC converter of claim 7 wherein said rectifying circuit means includes a diode having its anode connected to said inductor coil, a capacitor connected to the cathode of said diode and to the first DC voltage signal, said capacitor developing said second DC voltage signal thereacross.

9. The DC-to-DC converter of claim 8 wherein said rectifying circuit means further includes a Zener diode connected in parallel with said capacitor to regulate the value of said second DC voltage signal.

* * * * *

UNITED STATES PATENT AND TRADEMARK OFFICE
CERTIFICATE OF CORRECTION

PATENT NO. : 4,916,379

DATED : April 10, 1990

INVENTOR(S) : Thomas J. Wand and Phillip A. Gaubis

It is certified that error appears in the above-identified patent and that said Letters Patent is hereby corrected as shown below:

Column 5, Line 39, Claim 3, Change "1" to --2--.

Signed and Sealed this

Ninth Day of July, 1991

Attest:

HARRY F. MANBECK, JR.

Attesting Officer

Commissioner of Patents and Trademarks